United States Patent
Natsui et al.

(10) Patent No.: US 12,489,153 B2
(45) Date of Patent: Dec. 2, 2025

(54) METHOD FOR CHARGING NONAQUEOUS ELECTROLYTE SECONDARY CELL HAVING LITHIUM-TRANSITION METAL POSITIVE ELECTRODE ACTIVE MATERIAL

(71) Applicant: Panasonic Intellectual Property Management Co., Ltd., Osaka (JP)

(72) Inventors: Ryuichi Natsui, Osaka (JP); Mitsuhiro Hibino, Kyoto (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 669 days.

(21) Appl. No.: 17/801,190

(22) PCT Filed: Feb. 25, 2021

(86) PCT No.: PCT/JP2021/007145
§ 371 (c)(1),
(2) Date: Aug. 19, 2022

(87) PCT Pub. No.: WO2021/172447
PCT Pub. Date: Sep. 2, 2021

(65) Prior Publication Data
US 2023/0101615 A1    Mar. 30, 2023

(30) Foreign Application Priority Data
Feb. 27, 2020   (JP) .................................. 2020-031458

(51) Int. Cl.
*H01M 10/44*    (2006.01)
*H01M 4/505*    (2010.01)
(Continued)

(52) U.S. Cl.
CPC .......... *H01M 10/44* (2013.01); *H01M 4/505* (2013.01); *H01M 4/525* (2013.01);
(Continued)

(58) Field of Classification Search
CPC ............. H02J 7/007182; H01M 10/44; H01M 10/0525; H01M 10/48; H01M 4/505; H01M 4/525
See application file for complete search history.

(56) References Cited

U.S. PATENT DOCUMENTS 6,232,744 B1    5/2001  Kawai et al.
6,316,145 B1   11/2001  Kida et al.
(Continued)

FOREIGN PATENT DOCUMENTS

CN    110350185 A  * 10/2019  ........ H01M 10/0525
JP    2000-261905 A     9/2000
(Continued)

OTHER PUBLICATIONS

P. Vanaphuti, S. Bong, L. Ma, S. Ehrlich, and Y. Wang, "Systematic study of different anion doping on the electrochemical performance of cobalt-free lithium-manganese-rich layered cathode," ACS Applied Energy Materials, vol. 3, No. 5, pp. 4852-4859, Apr. 2020. doi: 10.1021/acsaem.0c00439 (Year: 2020).*
(Continued)

*Primary Examiner* — David V Henze-Gongola
(74) *Attorney, Agent, or Firm* — WHDA, LLP

(57) ABSTRACT

This charging method is A method for charging a nonaqueous electrolyte secondary cell containing a lithium-rich positive-electrode active material. When constant-current charging is performed to a predetermined voltage V2 which is equal to or higher than a setting voltage V1, and then constant-current discharging is performed to a predetermined voltage V3, V3<V1≤V2 is satisfied. Cell capacity C1
(Continued)

at V1, cell capacity C2 at V2, and cell capacity C3 at V3 satisfy $0.99C1 \leq C3 < C2$.

4 Claims, 4 Drawing Sheets

(51) Int. Cl.
  *H01M 4/525* (2010.01)
  *H01M 10/0525* (2010.01)
  *H01M 10/42* (2006.01)
  *H02J 7/00* (2006.01)

(52) U.S. Cl.
  CPC ... *H01M 10/0525* (2013.01); *H02J 7/007182* (2020.01); *H01M 2010/4292* (2013.01)

(56) References Cited

U.S. PATENT DOCUMENTS

| | | |
|---|---|---|
| 2004/0234865 A1 | 11/2004 | Sato et al. |
| 2012/0068666 A1 | 3/2012 | Abe et al. |
| 2012/0077064 A1 | 3/2012 | Sasakawa et al. |
| 2016/0190550 A1* | 6/2016 | Choi ............. H01M 4/505 252/182.1 |
| 2017/0092932 A1* | 3/2017 | Kim ............. C01G 53/82 |
| 2020/0166581 A1 | 5/2020 | Ukumori et al. |

FOREIGN PATENT DOCUMENTS

| | | |
|---|---|---|
| JP | 2004-55509 A | 2/2004 |
| JP | 2012-89470 A | 5/2012 |
| JP | 2017-11849 A | 1/2017 |
| JP | 2018-136157 A | 8/2018 |
| JP | 2019-61874 A | 4/2019 |
| WO | 98/40923 A1 | 9/1998 |
| WO | 2010/125649 A1 | 11/2010 |
| WO | 2018/221423 A1 | 12/2018 |
| WO | WO-2020246064 A1 * | 12/2020 |

OTHER PUBLICATIONS

Machine translation of WO-2020246064-A1 (Year: 2025).*
Extended (Supplementary) European Search Report dated Sep. 6, 2023, issued in counterpart EP application No. 21759669.1. (6 pages).
Office Action dated Jan. 10, 2023, issued in counterpart IN application No. 202247047572. (5 pages).
International Search Report dated May 25, 2021, issued in counterpart International Application No. PCT/JP2021/007145 (3 pages).

* cited by examiner

METHOD FOR CHARGING NONAQUEOUS ELECTROLYTE SECONDARY CELL HAVING LITHIUM-TRANSITION METAL POSITIVE ELECTRODE ACTIVE MATERIAL

CROSS-REFERENCE TO RELATED APPLICATION

This application is a National Phase Application filed under 35 U.S.C. § 371 of International Application No. PCT/JP2021/007145 filed on Feb. 25, 2021 which claims the benefit of priority under 35 U.S.C. § 119(a) of Japanese Patent Application No. 2020-031458 filed in Japan on Feb. 27, 2020, the contents of which are incorporated herein by reference.

TECHNICAL FIELD

The present disclosure generally relates to a method of charging a non-aqueous electrolyte secondary battery, and more particularly to a method of charging a non-aqueous electrolyte secondary battery including a lithium-excess positive electrode active material.

BACKGROUND ART

A lithium-transition metal composite oxide has been conventionally used commonly for a positive electrode active material for a secondary battery such as a battery, and a lithium-excess positive electrode active material, which contains lithium in a large amount, has attracted attention for a secondary battery with high capacity. Patent Literature 1 discloses a charging method including charging at a constant current and then charging at a constant voltage in order to inhibit expansion of a battery including a lithium-excess positive electrode active material, and to achieve a good discharge capacity and shortening of an initial charge time.

CITATION LIST

Patent Literature

PATENT LITERATURE 1: Japanese Unexamined Patent Application Publication No. 2019-61874

SUMMARY

Since a positive electrode including a lithium-excess positive electrode active material uses not only redox of a transition metal but also redox of an anion such as oxygen, unstable oxygen ($O^-$) may be present near the surface. This tendency is significant after charge until a certain high voltage or higher, and therefore the positive electrode and an electrolyte are likely to deteriorate. Since a secondary battery is used with repeated charges and discharges, maintaining a high potential with each charge results in deterioration of the battery, and hence lowered durability. The charging method disclosed in Patent Literature 1 still has room for improvement in the battery durability.

A charging method of an aspect of the present disclosure is a method of charging a non-aqueous electrolyte secondary battery including a lithium-excess positive electrode active material. The method includes charging a battery at a constant current until a predetermined voltage V2 that is equal to or higher than a set voltage V1, and then discharging the battery at a constant current until a predetermined voltage V3, wherein V3<V1≤V2, and a battery capacity C1 at V1, a battery capacity C2 at V2, and a battery capacity C3 at V3 satisfy 0.99C1≤C3<C2.

According to the charging method of an aspect of the present disclosure, both of high capacity and high durability can be achieved in a non-aqueous electrolyte secondary battery.

DESCRIPTION OF EMBODIMENTS

First, a basic principle of the present embodiment will be described. Conventionally performed for charging a secondary battery is a method including charging the battery at a constant current and terminating the charge when a voltage reaches a set voltage. However, charging a secondary battery using a positive electrode including a lithium-excess positive electrode active material with the above method until a state of high voltage such that the set voltage is higher than 4 V relative to a lithium electrode generates unstable oxygen ($O^-$), resulting in deterioration of the positive electrode and an electrolyte, leading to lowered battery capacity by repeated charges and discharges. The present inventors have intensively investigated the above problem, and as a result, have focused on a larger hysteresis property of a voltage (V) to a battery capacity (mAh/g) in charge and discharge of the secondary battery including the lithium-excess positive electrode active material than that of other NCA (Ni—Co—Al) based positive electrode active materials and the like, and have found a charging method of the following aspect that may achieve both of high capacity and high durability.

The charging method of an aspect of the present disclosure is a method of charging a non-aqueous electrolyte secondary battery including a lithium-excess positive electrode active material. The method includes charging a battery at a constant current until a predetermined voltage V2 that is equal to or higher than a set voltage V1, and then discharging the battery at a constant current until a predetermined voltage V3, wherein V3<V1≤V2, and a battery capacity C1 at V1, a battery capacity C2 at V2, and a battery capacity C3 at V3 satisfy 0.99C1≤C3<C2.

Figure 1:
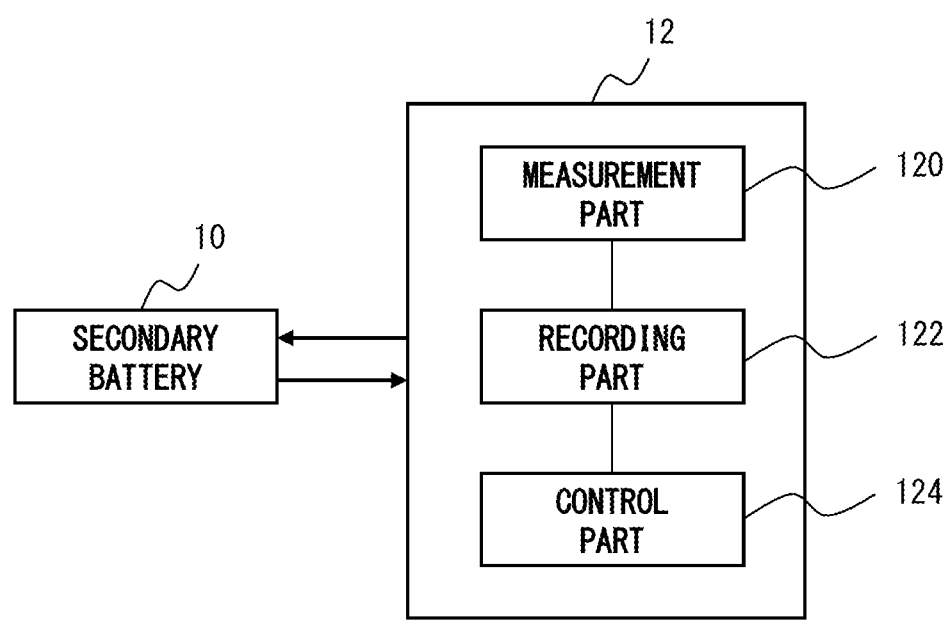
FIG. 1 is a constitution block diagram of a secondary battery and a discharge-charge-discharge controller in an example of an embodiment.

Next, the constitution of the present embodiment will be described. FIG. 1 is a constitution block diagram of a secondary battery 10 and a discharge-charge-discharge controller 12 in an example of an embodiment.

The secondary battery 10 is a lithium-ion secondary battery in which charge and discharge are performed by moving of lithium ions through a non-aqueous electrolyte between a positive electrode and a negative electrode, and includes a positive electrode having a positive electrode mixture layer including a positive electrode active material, and a negative electrode having a negative electrode mixture layer including a negative electrode active material. The shape of the secondary battery 10 is not particularly limited, and may be, for example, a cylindrical shape, a rectangular shape, and a coin shape, and may be a battery case constituted by a laminated sheet including a metal layer and a resin layer.

The positive electrode included in the secondary battery 10 is constituted by a positive electrode current collector such as, for example, a metal foil, and a positive electrode mixture layer formed on the positive electrode current collector. For the positive electrode current collector, a foil of a metal stable within a potential range of the positive electrode, such as aluminum, a film in which such a metal is disposed on a surface layer thereof, and the like may be used. The positive electrode mixture layer includes, for example, the positive electrode active material, a binder, and a conductive agent. The positive electrode may be produced by, for example, applying a positive electrode mixture slurry including the positive electrode active material, the hinder, the conductive agent, and the like on the positive electrode current collector, forming the positive electrode mixture layer by drying, and then rolling this positive electrode mixture layer.

For the positive electrode active material, a lithium-excess positive electrode active material is used. The lithium-excess positive electrode active material may include a lithium-transition metal composite oxide represented by the general formula $Li_xMn_yNi_zMe_{2-x-y-z}O_aF_b$, wherein $1 \leq x \leq 1.2$, $0.4 \leq y \leq 0.8$, $0 \leq z \leq 0.4$, $0 < b \leq 0.2$, $1.9 \leq a+b \leq 2.1$, and Me is at, least one element selected from the group consisting of Co, Ti, Al, Si, Sr, Nb, W, Mo, P, Ca, Mg, Sb, Na, B, V, Cr, Fe, Cu, Zn, Ge, Zr, Ru, K, and Bi. Since the secondary battery 10 including the lithium-excess positive electrode active material has a larger hysteresis property of a voltage to a battery capacity in charge and discharge than that of other NCA (Ni—Co—Al) based positive electrode active materials and the like, both of high capacity and high durability may be achieved by using the charging method of an aspect of the present disclosure, described later.

Examples of the conductive agent include carbon-based particles such as carbon black (CB), acetylene black (AB), Ketjenblack, and graphite. These materials may be used singly, and may be used in combination of two or more thereof. Examples of the binder include a fluororesin such as polytetrafluoroethylene (PTFE) and polyvinylidene fluoride PVdF), polyacrylonitrile (PAN), a polyimide resin, an acrylic resin, and a polyolefin resin. These materials may be used singly, and may be used in combination of two or more thereof.

The negative electrode included in the secondary battery 10 comprises a negative electrode current collector such as, for example, a metal foil, and a negative electrode mixture layer formed on the negative electrode current collector. For the negative electrode current collector, a foil of a metal stable within a potential range of the negative electrode, such as copper, a film in which such a metal is disposed on a surface layer thereof, and the like may be used. The negative electrode mixture layer includes, for example, a negative electrode active material, a thickener, and a binder. The negative electrode may be produced by, for example, applying a negative electrode mixture slurry including the negative electrode active material, the thickener, the binder, and the like on the negative electrode current collector, forming the negative electrode mixture layer by drying, and then rolling this negative electrode mixture layer.

The negative electrode active material is not particularly limited as long as it is a material that may occlude and release lithium ions, and for example, carbon materials such as graphite, hardly-graphitizable carbon, easily-graphitizable carbon, fabric carbon, coke, and carbon black may be used. For the negative electrode active material, a non-carbon material such as, for example, silicon, tin, and an alloy or oxide mainly composed thereof may also be used.

For the binder, PTFE may be used similar to that in the positive electrode, and styrene-butadiene copolymer (SBR) or a modified product thereof may also be used, for example. For the thickener, carboxymethylcellulose (CMC) or a modified product thereof (including a salt such as a Na salt) may be used, for example.

The non-aqueous electrolyte included in the secondary battery 10 includes a non-aqueous solvent and an electrolyte salt. For the non-aqueous solvent (organic solvent), carbonates, lactones, ethers, ketones, and esters may be used, for example, and two or more of these solvents may be mixed to be used. For the electrolyte salt, $LiPF_6$, $LiBF_4$, $LiCF_3SO_3$, and a mixture thereof may be used, for example. An amount of the dissolved electrolyte salt to the non-aqueous solvent may be set to be, for example, 0.5 to 2.0 mol/L.

In FIG. 1, the discharge-charge-discharge controller 12 measures a voltage, battery capacity, and the like of the secondary battery 10, and controls charge and discharge of the secondary battery 10. The discharge-charge-discharge controller 12 comprises a processor and a memory, and includes a measurement part 120, a recording part 122, and a control part 124 as functional blocks.

The measurement part 120 measures the voltage and battery capacity of the secondary battery 10. The measurement part 120 may measure a time from the beginning of charge.

The recording part 122 records the voltage and battery capacity of the secondary-battery 10 measured by the measurement part 120. The recording part 122 may record the time from the beginning of charge.

The control part 124 controls the charge and discharge of the secondary battery 10. The control part 124 terminates the charge at a constant current to begin the discharge at a constant current when the voltage of the secondary battery 10 measured by the measurement part 120 reaches a predetermined voltage. Then, the control part 124 terminates the discharge at a constant current when a voltage reaches a predetermined voltage.

Figure 2:
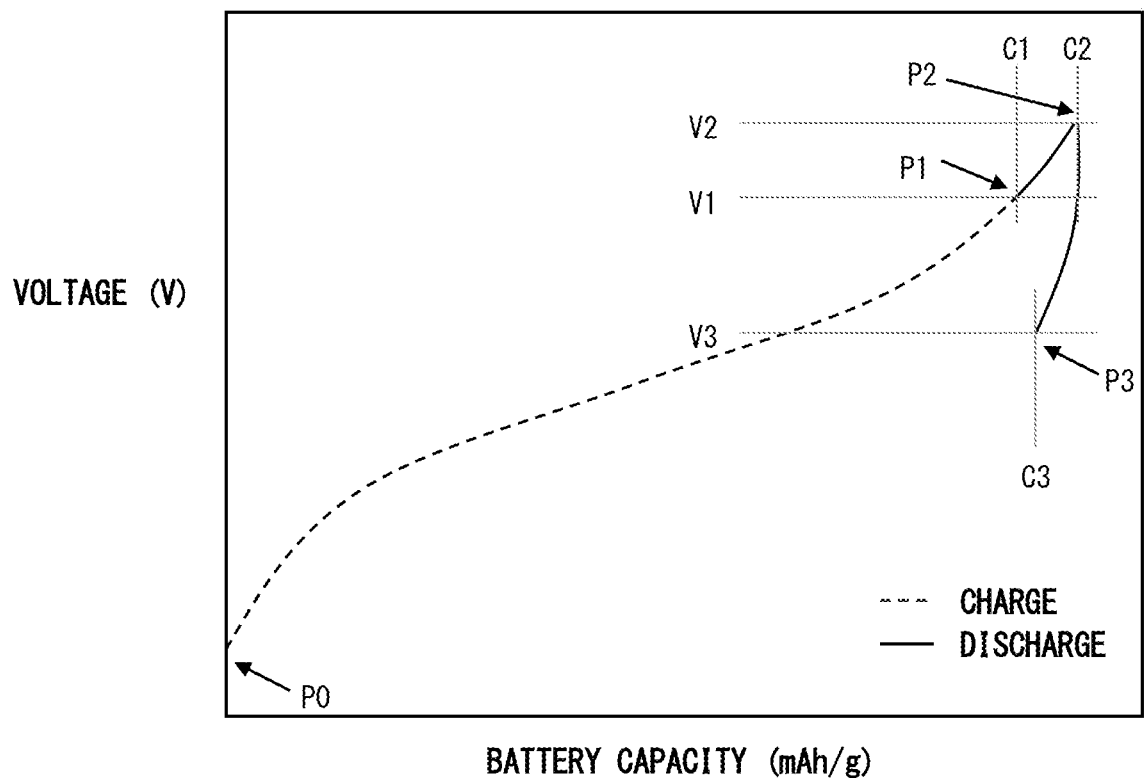
FIG. 2 is a view illustrating a charging method of an example of an embodiment.

Next, the specific charging method will be described. FIG. 2 is a view illustrating a charging method of an example of an embodiment.

The secondary battery 10 before the charge is in a P0 state having a certain voltage and a certain battery capacity. When the charge at a constant current starts, the battery capacity of the secondary battery 10 increases from the P0 state, and the voltage rises to reach a P1 state. In the P1 state, the voltage is a set voltage V1, and the battery capacity is C1. A vicinity of the set voltage V1 is a state where the high voltage is likely to generate unstable oxygen ($O^-$).

V1 may be not less than 4.4 V relative to a lithium electrode (hereinafter, a potential relative to a lithium electrode may be designated with vs Li). Since this configuration increases the battery capacity C1, the secondary battery 10 with high capacity (C3) and lowered voltage (V3) can be obtained.

Next, the secondary battery 10 is charged at a constant current until a predetermined voltage V2 that is equal to or higher than the set voltage V1 even after the voltage has reached the set voltage V1, to reach a P2 state. In the P2 state, the battery capacity is C2.

V2 may be not more than 4.9 V relative to a lithium electrode. When V2>4.9 V vs Li, damages may remain in the positive electrode or the electrolyte liquid, resulting in deteriorated durability.

Furthermore, the secondary battery 10 is discharged at a constant current until a predetermined voltage V3 to reach a P3 state. In the P3 state, the battery capacity is C3. From the above relationship, V1, V2 and V3 satisfy V3<V1<V2. With V3<V1, the secondary battery 10 in the P3 state may inhibit generation of the unstable oxygen (O⁻) compared with the secondary battery 10 in the P1 state. The discharge at a constant current is preferably begun as soon as possible after the secondary battery 10 has reached the P2 state. A time of maintaining the P2 state may be, for example, 1 minute or shorter, and is preferably 30 seconds or shorter, and more preferably 10 seconds or shorter.

Since the charge and discharge of the secondary battery including the lithium-excess positive electrode active material has a relatively larger hysteresis with a voltage to a battery capacity, the battery capacity C3 of the secondary battery 10 in the P3 state may be set to be substantially the same as or higher than the battery capacity C1 of the secondary battery 10 in the P1 state. In other words, C1, C2, and C3 may be set to satisfy $0.99C1 \leq C3 < C2$. Since this configuration may increase the battery capacity of the secondary battery 10 at the end of charge (P3 state) and may lower the voltage, the battery durability increases.

C3 is preferably SOC 90% or more, and further preferably SOC 95% or more. The secondary battery 10 at the end of charge (P3 state) closer to the full charge makes the above effect more remarkable.

Figure 3:
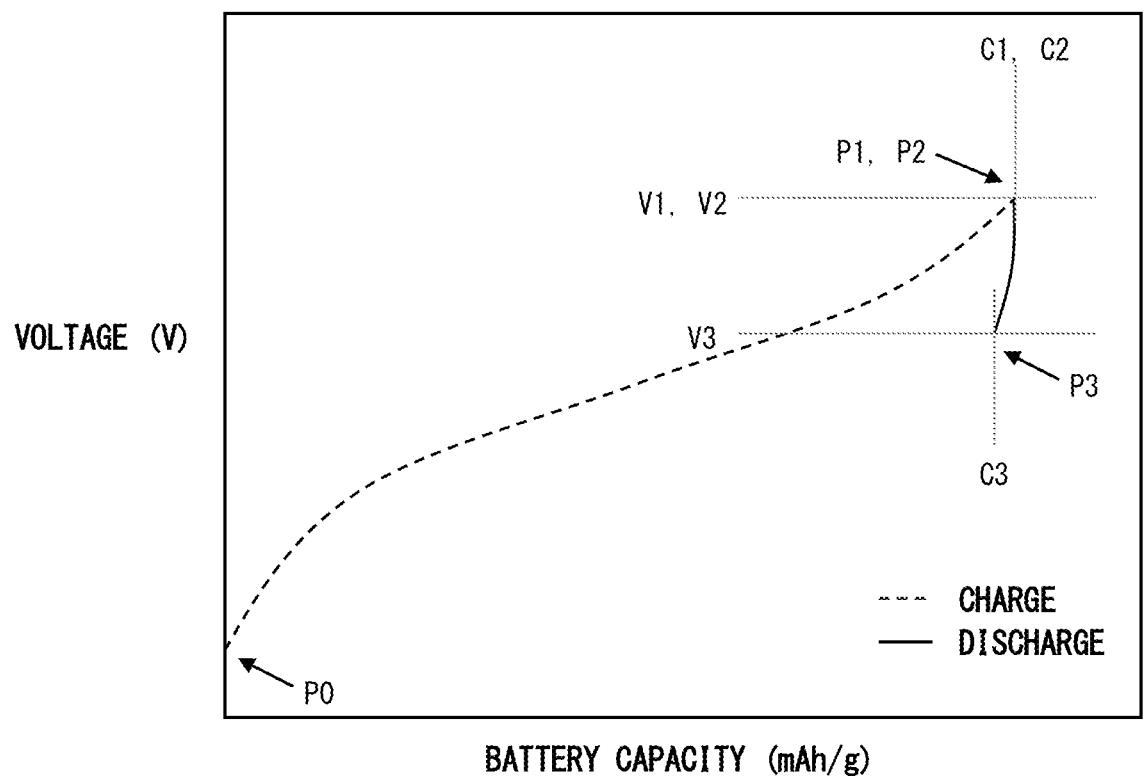
FIG. 3 is a view illustrating a charging method of another example of an embodiment.

FIG. 3 is a view illustrating a charging method of another example of embodiment.

The secondary battery 10 before the charge is in a P0 state having a certain voltage and a certain battery capacity, similar to FIG. 2, and the charge at a constant current allows the secondary battery 10 to reach a P1 state where the voltage is a set voltage V1 and the battery capacity is C1. A vicinity of the set voltage V1 is a state where the high voltage is likely to generate unstable oxygen (O⁻). In the method exemplified in FIG. 3, which differs from the case in FIG. 2, the secondary battery 10 is not charged at a constant current from the set voltage V1 to V2, and discharged at a constant current until a predetermined voltage V3 to reach a P3 state. That is, V1, V2, and V3 satisfy V3<V1=V2. With V3<V1, the secondary battery 10 in the P3 state may inhibit generation of the unstable oxygen (O⁻¹) compared with the secondary battery 10 in the P1 state. Here, it may be 4.4 V vs Li≤V1 (V2)≤4.9 V vs Li.

Also, in the method exemplified in FIG. 3, similar to the case of FIG. 2, C1, C2, and C3 may be set to satisfy $0.99C1 (C2) \leq C3 < C1 (C2)$. Since this configuration may increase the battery capacity of the secondary battery 10 at the end of charge (P3 state) and may lower the voltage, the battery durability increases. Here, C3 is preferably SOC 90% or more, and further preferably SOC 95% or more.

Figure 4:
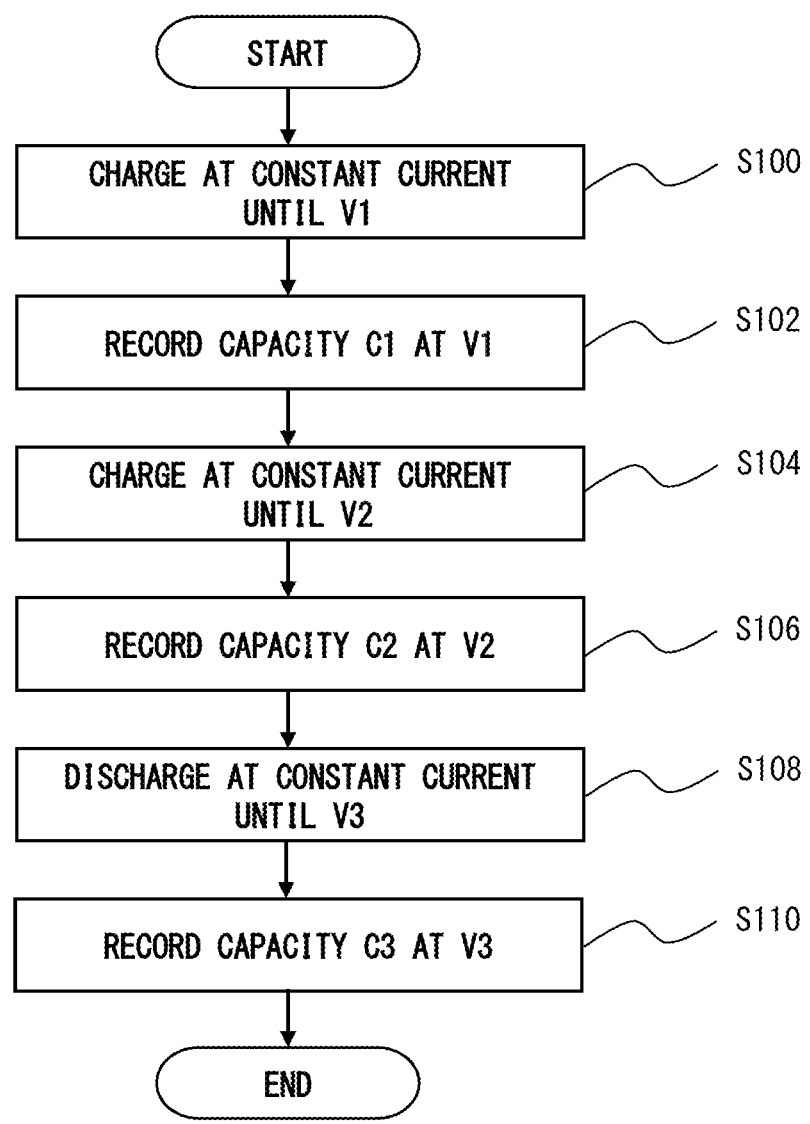
FIG. 4 is a process flowchart of the charging method illustrated in FIG. 2.

FIG. 4 is a process flowchart of the charging method illustrated in FIG. 2.

First, with the measurement part 120 measuring a voltage and a battery capacity, the control part 124 charges the secondary battery 10 at a constant current until the set voltage V1 (S100). The recording part 122 records the battery capacity C1 at a time when the secondary battery 10 reaches the voltage V1 (S102). At the same time, the recording part 122 may record t1, which is a time from the beginning of charge.

Then, with the measurement part 120 measuring a voltage and a battery capacity, the control part 124 charges the secondary battery 10 at a constant current until a predetermined voltage V2 (S104). The recording part 122 records the battery capacity C2 at a time when the secondary battery 10 reaches the voltage V2 (S106). At the same time, the recording part 122 may record t2, which is a time from the beginning of charge.

Thereafter, with the measurement part 120 measuring a voltage and a battery capacity the control part 124 discharges the secondary battery 10 at a constant current until a predetermined voltage V3 (S108). The recording part 122 records the battery capacity C3 at a time when the secondary battery 10 reaches the voltage V3 (S110). At the same time, the recording part 122 may record t3, which is a time from the beginning of charge.

By performing the above steps, the secondary battery 10 in the P3 state is obtained. After the secondary battery 10 in the P3 state is used (discharged) to return to the initial P0 state, the secondary battery 10 in the P3 state may be obtained by performing the above steps again. In this time, the secondary battery 10 may be charged by using t1, t2, and t3 recorded by the recording part 122 instead of the measurement of the voltages and the battery capacities by the measurement part 120.

The charging method illustrated in FIG. 3 may also be processed with a flowchart similar to FIG. 4.

EXAMPLES

Hereinafter, the present disclosure will be further described with Examples, but the present disclosure is not limited to these Examples.

Example 1

[Production of Positive Electrode]

A positive electrode active material having the composition represented by the general formula $Li_{1.1166}Mn_{0.556}Ni_{0.278}O_{1.94}F_{0.06}$, acetylene black, and polyvinylidene fluoride (PVdF) were mixed at a mass ratio of 92:5:3, and N-methyl-2-pyrrolidone (NMP) was used as a dispersion medium to prepare a positive electrode mixture slimy. Then, this positive electrode mixture shiny was applied on a surface of a positive electrode core made of aluminum foil, the applied film was dried and compressed, and then cut to a predetermined electrode size to produce a positive electrode in which a positive electrode mixture layer was formed on the positive electrode core.

[Preparation of Non-Aqueous Electrolyte]

Into a mixed solvent of fluoroethylene carbonate (FEC) and methyl 3,3,3-trifluoropropionate (FMP) at a mass ratio of 1:3, $LiPF_6$ was dissolved at a concentration of 1 mol/L to prepare a non-aqueous electrolyte.

[Production of Test Cell]

Lead wires were attached to each of the positive electrode and a counter electrode made of Li metal, and the positive electrode and the counter electrode were oppositely disposed with a separator made of a polyolefin interposed therebetween to produce an electrode assembly. This electrode assembly and the non-aqueous electrolyte were enclosed in an exterior housing body constituted by an aluminum laminated film to produce a test cell. The test cell was charged under a temperature environment at 25° C. at a constant current of 0.5 It until a battery voltage reached 3.0 V vs Li (V0) to specify this state as an initial state.

[Evaluation of Energy Density Maintenance Rate after Cycle Test]

On the test cell in the initial state, the following cycle test was performed. In the cycle test, a discharge capacity at the 1st cycle and a discharge capacity at the 25th cycle were determined to calculate a capacity maintenance rate with the following formula, and the capacity maintenance rate was multiplied with an average voltage during the discharge $V_{ave}$ to calculate an energy density maintenance rate.

Capacity Maintenance Rate (%)=(Discharge Capacity at 25th Cycle/Discharge Capacity at 1st Cycle)×100

Energy Density Maintenance Rate (%)=Capacity Maintenance Rate×Average Voltage $V_{ave}$ <Cycle Test>

First, under a temperature environment at 25° C., the test cell in the initial state was charged at a constant current until a battery voltage reached 4.75 V vs Li (V2), which was equal to or higher than a set voltage 4.7 V vs Li (V1), and then discharged at a constant current of 0.5 It until a battery voltage reached 4.5 V vs Li. Thereafter, the test cell was discharged at a constant current of 1 It until a battery voltage reached 3.0 V vs Li (V0). This charge-discharge cycle was repeated with 25 cycles.

Examples 2 to 4

The test cell was evaluated in the same manner as in Example 1 except that V1, V2, and V3 were changed as in Table 1.

Comparative Example 1

The test cell was charged at a constant current until a battery voltage reached the set voltage 4.7 V vs Li (V1), Then, the test cell was discharged at a constant current of 1 It until a battery voltage reached 3.0 V vs Li (V0). This charge-discharge cycle was repeated with 25 cycles.

Comparative Example 2

The test cell was evaluated in the same manner: as in Comparative Example 1 except that V1 was changed to be 4.6 V vs Li.

Table 1 summarizes the results of the energy density maintenance rates of the test cells in. Examples and Comparative Examples. Table 1 shows the energy density maintenance rates in Examples 1 and 2 as relative values relative to the energy density maintenance rate in Comparative Example 1 being 100, and shows the energy density maintenance rates in Examples 3 and 4 as relative values relative to the energy density maintenance rate in Comparative Example 2 being 100. Table 1 also shows the voltages (V1, V2, and V3) and the battery capacities (C1, C2, and C3) of the test cell in the P1, P2, and P3 states in Examples and Comparative Examples.

TABLE 1

| | Voltage (V vs Li), Battery capacity (mAh/g) | | | | | | Evaluation results | |
| | P1 | | P2 | | P3 | | | Energy density maintenance | Relative |
| | V1 | C1 | V2 | C2 | V3 | C3 | C3/C1 | rate (%) | value |
| Example 1 | 4.7 | 286 | 4.75 | 291 | 4.5 | 285 | 1.00 | 96.1 | 104 |
| Example 2 | 4.7 | 286 | 4.8 | 293 | 4.5 | 286 | 1.00 | 95.7 | 104 |
| Comparative Example 1 | 4.7 | 286 | — | — | — | — | — | 92.4 | 100 |
| Example 3 | 4.6 | 272 | 4.7 | 286 | 4.5 | 274 | 1.01 | 96.9 | 102 |
| Example 4 | 4.6 | 272 | 4.7 | 286 | 4.4 | 270 | 0.99 | 97.2 | 102 |
| Comparative Example 2 | 4.6 | 272 | — | — | — | — | — | 94.8 | 100 |

The test cells in Examples 1 and 2 have higher energy density maintenance rates than the test cell in Comparative Example 1, and the test cells in Examples 3 and 4 have higher energy density maintenance rates than the test cell in Comparative Example 2.

REFERENCE SIGNS LIST

10 Secondary battery
12 Discharge-charge-discharge controller
120 Measurement part
122 Recording part
124 Control part

The invention claimed is:

1. A method of charging a non-aqueous electrolyte secondary battery including a positive electrode active material, the method including:
    charging a battery at a constant current until a predetermined voltage V2 that is equal to or higher than a set voltage V1, and then discharging the battery at a constant current until a predetermined voltage V3, wherein

V3<V1≤V2, a battery capacity C1 at V1, a battery capacity C2 at V2, and a battery capacity C3 at V3 satisfy 0.99C1≤C3<C2, and
    the positive electrode active material includes a lithium-transition metal composite oxide represented by the general formula $Li_xMn_yNi_zMe_{2-x-y-z}O_aF_b$, wherein 1≤x≤1.2, 0.4≤y≤0.8, 0≤z≤0.4, 0<b≤0.2, 1.9≤a+b≤2.1, and Me is at least one element selected from the group consisting of Co, Ti, Al, Si, Sr, Nb, W, Mo, P, Ca, Mg, Sb, Na, B, V, Cr, Fe, Cu, Zn, Ge, Zr, Ru, K, and Bi.

2. The charging method according to claim 1, wherein V1 is not less than 4.4 V relative to a lithium electrode.

3. The charging method according to claim 1, wherein V2 is not more than 4.9 V relative to a lithium electrode.

4. The charging method according to claim 1, wherein C3 is SOC 90% or more.

* * * * *